UNITED STATES PATENT OFFICE.

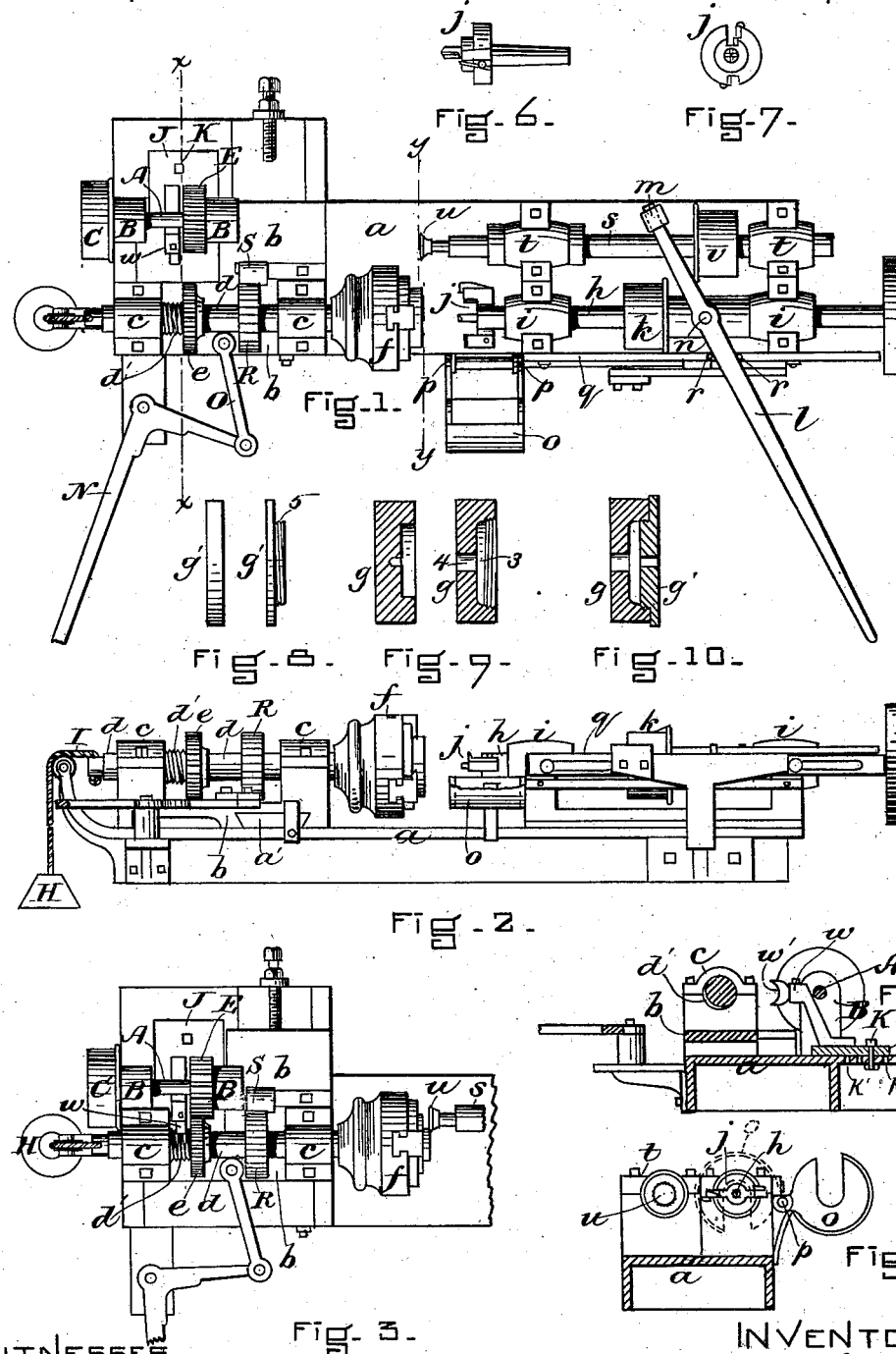

HARVEY REDDING, OF EVERETT, ASSIGNOR TO HIMSELF AND JEROME REDDING, OF MALDEN, MASSACHUSETTS.

MACHINE FOR FORMING ANNULAR SURFACES AND CUTTING SCREW-THREADS THEREON.

SPECIFICATION forming part of Letters Patent No. 293,911, dated February 19, 1884.

Application filed June 26, 1883. (No model.)

*To all whom it may concern:*

Be it known that I, HARVEY REDDING, of Everett, in the county of Middlesex and State of Massachusetts, have invented certain Improvements in Machines for Forming Annular Surfaces and Cutting Screw-Threads Thereon, of which the following is a specification.

This invention has for its object to provide an improved machine for forming annular surfaces on circular articles of wood or other like material, and cutting screw-threads on said surfaces. The hereinafter-described machine embodying said invention is adapted to form either external or internal annular surfaces and screw-threads, and is used for the production of push-button cases or boxes, composed of a chambered internally-threaded portion and a flanged externally-threaded cover or back adapted to be screwed into the chambered portion.

The invention consists, as a whole, in the combination of a chuck or holder mounted on an arbor adapted to be moved both laterally and longitudinally from a normal position; a rotated primary cutter adapted to be presented to the article held by the chuck when the latter is in its normal position; a rotated thread cutter or saw located at one side of the primary cutter, and automatic feeding devices whereby when the chuck or holder is moved laterally from its normal position it is rotated, and at the same time moved longitudinally and presented to the thread cutter or saw.

The invention also consists in certain details of construction and combination of parts, all of which I will now proceed to describe and claim.

Of the accompanying drawings, forming a part of this specification, Figure 1 represents a top plan view of a machine embodying my invention. Fig. 2 represents a front elevation of the same. Fig. 3 represents a partial top view, showing a different position of the chuck-holding arbor. Fig. 4 represents a section on line *x x*, Fig. 1, looking toward the left-hand end. Fig. 5 represents a section on line *y y*, Fig. 1, looking toward the right-hand end. Figs. 6 and 7 represent, respectively, side and end views of the form of cutter used in making the chambered portion of the article. Fig. 8 shows in elevation the completed blank from which it is formed. Fig. 9 shows in section the completed chambered portion or body and the blank from which it is formed. Fig. 10 represents a section of the body and back as formed by my improved machine, said parts being connected.

The same letters of reference indicate the same parts in all the figures.

In the drawings, *a* represents the horizontal frame or bed of the machine, having near one end a transverse dovetail guide, *a'*, on which is fitted to slide a carriage, *b*.

*c c* are bearings supported by said carriage, and *d* is an arbor journaled in said bearings and adapted to move lengthwise therein to a limited extent. The arbor *d* is provided with a screw-threaded portion, *d'*, a pinion, *e*, near said portion, and a chuck or holder, *f*, at its inner end, to hold the blank to be formed, said blank being, for example, the back or cover *g'*. (Shown in Fig. 8.)

*h* represents an arbor journaled in fixed bearings *i i*, and adapted to move lengthwise in said bearings toward and from the chuck *f*, the arbor *h* being in line with the arbor *d* when the latter is in its normal position, as shown in Figs. 1, 3, and 4. The arbor *h* is provided at its inner end with a primary cutter, *j*, adapted to form the desired surface on the blank held by the chuck, said cutter being detachably secured to the arbor, so that it can be replaced by another of different form. The cutter shown in Figs. 1 and 2 is adapted to form the reduced portion or shoulder 5 on the back or cover *g'*. (Shown in Fig. 8.) The cutter shown in Figs. 6 and 7 is adapted to form the chamber 3 and central orifice, 4, in the body *g*. (See Fig. 9.) A pulley, *k*, is secured to the arbor *h*, and is belted to a driving-shaft, whereby the arbor *h* and its cutter are rotated.

*l* represents a hand-lever adapted to slide at one end in a perforated block, *m*, pivoted to the bed of the machine, and pivoted at *n* to the arbor *h*, so that by swinging said lever the arbor can be moved to present its cutter to and withdraw it from the blank held in the chuck $f$.

$o$ represents a shield hinged at $p\,p$ to the frame $a$, and adapted to be swung over the cutter $j$, as shown in dotted lines in Fig. 5, when the latter is drawn back from the chuck, and thus protect the operator's hand when applying and removing the article held by the chuck. When the shield is in position described, it constitutes a stop for the end of a sliding bar, $q$, which is engaged with the lever $l$ by means of two pins, $r\,r$, so as to move with said lever. The shield, therefore, while covering the cutter, prevents the cutter from being accidentally moved forward and injured by contact with the shield.

$s$ represents an arbor journaled in fixed bearings $t\,t$ beside the arbor $h$, and provided with a small buzz-saw, $u$, or other tool adapted to cut a narrow groove or thread. The arbor $s$ is provided with a pulley, $v$, belted to the driving-shaft.

$w$ represents a fixed arm, having a face, $w'$, Fig. 4, provided with segments of a screw-thread corresponding to the threaded portion $d'$ of the arbor $d$.

A represents a short arbor, journaled in bearings B B near the arm $w$, and provided with a pulley, C, belted to a driving-shaft, and with a pinion, E, adapted to mesh with the pinion $e$ of the arbor $d$.

After the primary cutter $j$ has been presented to the article held in the chuck, and has formed the desired surface thereon, the carriage $b$, with the arbor $d$ and its chuck $f$, are moved laterally until the threaded portion $d'$ of the arbor $d$ is engaged with the threaded portion of the fixed arm $w$, and the pinion E of the arbor A is engaged with the pinion $e$ of the arbor $d$, as shown in Fig. 3, said engagements occurring simultaneously. The arbor A is continuously rotated, and therefore rotates the arbor $d$ as soon as said engagements occur. The rotation of the arbor $d$, together with the engagement of said threaded portions, causes the arbor $d$ and its chuck to move forward while rotating toward the saw or thread-cutter $u$, and present the surface previously formed, as above described, by the primary cutter, to said saw, which is thus caused to cut a screw-thread in said surface having the same pitch as the thread on the portion $d'$ of the arbor $d$. When the thread is sufficiently cut, the attendant moves the carriage $b$ away from the arbor A, and thereupon a weight, H, or equivalent retracting device, acting through a cord, I, attached to the end of the arbor $d$, draws said arbor back longitudinally. The article can then be removed from the chuck and another substituted for it. The arm $w$ and bearings B B of the arbor A are supported by a plate or bracket, J, which is secured to the bed $a$ by a screw or screws, K. (See Fig. 4.) The bed $a$ is provided with two or more holes, K', for each screw K, so that the plate J, with its attachments, can be adjusted laterally of the bed, and thus vary the extent to which the arbor $d$ can be moved laterally from the position shown in Fig. 1. This adjustment of the plate or bracket J adapts the machine to different sizes of articles or to different kinds of work. For example, the back or cover $g'$ is provided with an external thread on its reduced portion, as shown in Fig. 8, while the body $g$ is provided with an internal thread, as before described.

It is obvious that a shorter lateral movement of the arbor $d$ and its chuck is required in presenting the surface of the part $g'$ to the saw than the surface of the part $g$; hence, when the machine is adapted to act on the part $g'$, the plate or bracket J is moved nearer the normal position of the arbor $d$ than when the machine is adapted to act on the part $g$.

The threaded portion $d'$, pinion $e$, threaded arm $w$, and positively-rotated pinion E constitute a good and practical automatic feeding mechanism; but it is obvious that my invention is not confined to said details, so far as the automatic feeding of the blank to the saw is concerned. Said details may be variously modified, or other equivalent devices may be substituted for them without departing from the spirit of my invention. The carriage $b$ is moved back and forth by means of a bell-crank lever, N, pivoted to the frame $a$, and connected by a link, O, with said carriage.

To prevent the arbor $d$ from being rotated by the primary cutter $j$ when the latter attacks the blank, I provide a ratchet, R, which is engaged by a pawl, S, pivoted to an arm attached to the bed $a$. The arbor is thus prevented from rotating in the same direction with the cutter.

When the arbor $d$ is being rotated and moved endwise to enable the saw $u$ to form the screw-thread on the blank, its rotation is in a direction opposite to that in which the primary cutter rotates, so that the dog $b$ does not arrest the ratchet R.

I claim—

1. The combination of a chuck or holder mounted on an arbor, mechanism, substantially as described, adapted to move said arbor both laterally and longitudinally from a normal position, a rotated primary cutter adapted to be presented to the article held by the chuck when the latter is in its normal position, a rotated thread cutter or saw located at one side of the primary cutter, and automatic feeding devices, substantially as described, whereby when the chuck or holder is moved laterally from its normal position it is rotated and at the same time moved longitudinally and presented to the thread cutter or saw, as set forth.

2. An organized machine for forming circular screw-threaded articles of wood or like material, the same consisting of a supporting-frame, a carriage movable laterally on guides on said frame, an arbor journaled in bearings on said carriage, provided with a threaded portion and with a pinion and capable of a limited endwise movement in its bearings, a chuck or holder on said arbor for the article to be formed, an arbor having a primary cutter for partially forming said article, and adapted to be moved endwise to present its cutter to the article, a rotary thread cutter or saw mounted on an arbor beside the primary cutter, a fixed arm at one side of the chuck-carrying arbor, having segmental threads adapted to engage with the threaded portion of said arbor when the latter is moved laterally from its normal position, and a positively-rotated arbor journaled in fixed bearings and provided with a pinion adapted to engage with the pinion of the chuck-carrying arbor when the same is moved laterally from its normal position, whereby when the chuck-carrying arbor is so moved the article held by the chuck is presented to the thread cutter or saw and the arbor is positively rotated and moved progressively endwise, thereby causing said cutter or saw to form a screw-thread on said article, as set forth.

3. The combination of the longitudinally-movable arbor carrying the primary cutter, the hand-lever $l$, pivoted to said arbor and having a pivotal connection with the frame of the machine, the slide $q$, engaged with said lever, and the shield $o$, forming, when covering the cutter, a stop or bearing for the end of said slide, and thus preventing the endwise movement of the arbor and cutter, as set forth.

4. The combination, with the slide or carriage $b$, supporting the chuck-holding arbor $d$, of the automatic feeding devices, substantially as described, the bracket J, supporting said devices, means for adjusting said bracket toward or from the normal position of said arbor, and means for positively securing said bracket in any position to which it may be adjusted, as set forth.

5. The combination, with a chuck carried by a laterally-movable arbor, of a fastening device, substantially such as described, which retains the arbor from rotation in one direction while in one of its lateral positions, and driving mechanism, substantially as described, which engages and rotates said arbor in the direction in which it is free to move when said arbor is shifted into its other position, substantially as set forth.

In testimony whereof I have signed my name to this specification, in the presence of two subscribing witnesses, this 21st day of June, 1883.

HARVEY REDDING.

Witnesses:
JOHN M. TUOHAY,
C. F. BROWN.